Patented Nov. 28, 1950

2,532,120

UNITED STATES PATENT OFFICE 2,532,120

CONDENSATES OF ROSIN WITH UNSATURATED CARBOCYCLIC COMPOUNDS

Alfred L. Rummelsburg, Wilmington, Del., assignor to Hercules Powder Company, Wilmington, Del., a corporation of Delaware No Drawing. Application May 21, 1946, Serial No. 671,392

19 Claims. (Cl. 106—227)

This invention relates to resinous condensation products of rosin with unsaturated carbocyclic compounds and to esters of said condensation products and to varnish compositions containing them.

Rosin has long been known to be deficient alone or in the form of its esters for use in varnishes, particularly because of its softness and poor bodying characteristics. Polymerization of rosin has been one means practiced by the art to overcome such deficiencies. By polymerization of rosin some improvement has been obtained but products which would be entirely satisfactory from the standpoint of bodying and drying characteristics have not been produced by polymerization alone.

Now in accordance with this invention, it has been found that rosin may be condensed with unsaturated carbocyclic compounds to form novel resinous condensation products which may be esterified, the condensation products more particularly in the form of their esters exhibiting the desired improvement in bodying, drying, and flexibility characteristics when used in varnishes and other coating compositions.

More particularly, the condensation products of rosin with unsaturated carbocyclic compounds of this invention are resinous products obtained by condensing a rosin with an unsaturated carbocyclic compound which is capable of self polymerization to a hemicolloid with a condensation catalyst at temperatures within the range of about −10° C. to about 150° C. depending upon the particular materials being condensed and other factors.

The conditions for effecting the condensation of rosin with the unsaturated carbocyclic compounds are more specifically set forth in the following examples. Unless otherwise noted all weights are parts by weight.

Example 1

To a solution of 450 parts inhibitor-free styrene and 1560 parts wood rosin dissolved in 2340 parts benzene was added boron trifluoride gas over a period of 0.75 hour with stirring while maintaining the temperature at about 17–25° C. with external cooling until 36 parts boron trifluoride was absorbed. The solution thus prepared was then allowed to stand for 4 hours at a temperature of about 17–25° C. The solution was then poured into an equal volume of water and washed with warm water (50–60° C.) to remove the catalyst. About 250 parts xylene was added to reduce the viscosity during the distillation to remove benzene, and both benzene and the last of the xylene were removed by heating up to about 200° C. at 15–25 mm. pressure. The rosin condensate thus freed of solvent amounted to 1976 parts by weight and had the following analysis: acid number 123, drop melting point 124° C. From the weight of the condensate, it is calculated that the rosin-styrene condensate contains about 0.8+ mole of styrene per mole of rosin.

Examples 2 to 16 were carried out in a similar manner. The data on the condensation and characteristics of the rosin condensates are set forth in Table I. The rosins used were pale wood rosins.

Table I

| Example | Carbocyclic Compound | Reactants | | Reaction Conditions | | | | | |
|---|---|---|---|---|---|---|---|---|---|
| | | Weight Carbocyclic Compound | Weight Rosin | Catalyst | Weight Catalyst | Solvent | Weight Solvent | Time, Minutes | Temperature, °C. |
| 1 | Styrene | 450 | 1,560 | $BF_3$ | 36 | Benzene | 2,340 | 235 | 17–25 |
| 2 | do | 458 | 600 | do | 20 | do | 900 | 290 | 11–28 |
| 3 | do | 15 | 100 | do | 2 | do | 150 | 105 | 30 |
| 4 | do | 59 | 100 | do | 3 | do | 159 | 110 | 20–23 |
| 5 | alpha-Methyl Styrene | 45 | 300 | do | 7 | do | 450 | 130 | 23–30 |
| 6 | Dichlorostyrene | 37 | 75 | do | 3 | do | 113 | 120 | 24–30 |
| 7 | alpha-Methyl-para-Methyl Styrene | 94 | 250 | do | 7 | do | 375 | 90 | 24–30 |
| 8 | Divinyl Benzene (40%) | 500 | 1,504 | do | 15 | do | 2,256 | 240 | 20–25 |
| 9 | do | 40 | 860 | do | 18 | do | 1,290 | 240 | 25–30 |
| 10 | Divinyl Benzene (50%) | 30 | 200 | $ZnCl_2$ | 6 | Naphtha | 100 | 240 | 130 |
| 11 | do | 44 | 240 | $H_2SO_4$ | 50 | Benzene | 360 | 60 | 20–29 |
| 12 | Diisopropenyl Benzene | 31 | 137 | $BF_3$ | 4 | do | 219 | 90 | 25–30 |
| 13 | Cyclopentadiene | 112 | 600 | do | 12 | do | 900 | 240 | 20–25 |
| 14 | Indene B. P. 114° C./100 mm. $n_D^{20}$ 1.5739. | 32.5 | 100 | do | 2 | do | 150 | 240 | 20–30 |
| 15 | Indene (40%) | 385 | 700 | do | 14 | do | 1,050 | 210 | 15–25 |
| 16 | Phenyl Acetylene | 20 | 70 | do | 1.4 | do | 110 | 240 | 20–30 |
| 17 | Styrene | 91 | 302 | HF | 18 | do | 393 | 240 | 15–40 |

Table I—Continued

| Example | Carbocyclic Compound | Products | | | | |
|---|---|---|---|---|---|---|
| | | Weight | Acid Number | Drop Melting Point | Unsaponifiable Content | Molecular Weight |
| 1 | Styrene | 1,976 | 123 | 124 | | |
| 2 | do | 1,043 | 89.5 | 135 | | |
| 3 | do | 114 | 137.5 | 120 | | |
| 4 | do | 160 | 93 | 135 | 6.1 | 412 |
| 5 | alpha-Methyl Styrene | 330 | 144 | 115 | 8.6 | 588 |
| 6 | Dichlorostyrene | 88 | | 118 | 9.8 | |
| 7 | alpha-Methyl-para-Methyl Styrene | 328 | | 104 | | |
| 8 | Divinyl Benzene (40%) | 1,992 | 116 | 165.5 | 3.8 | |
| 9 | do | 967 | 133 | 145 | | |
| 10 | Divinyl Benzene (50%) | 228 | 135.5 | 131 | 6.9 | |
| 11 | do | 285 | 126 | 136 | 6.1 | |
| 12 | Diisopropenyl Benzene | 166 | 128 | 129 | 6.3 | |
| 13 | Cyclopentadiene | 710 | 134 | 129 | 4.8 | |
| 14 | Indene B. P. 114° C./100 mm. $n_D^{20}$ 1.5739 | 134 | 116 | 145 | 8.1 | |
| 15 | Indene (40%) | 908 | 123 | 134 | | |
| 16 | Phenyl Acetylene | 90 | 101 | 125 | 14.6 | |
| 17 | Styrene | 384 | 126.5 | 120.5 | 9.2 | |

The rosins which are used are those having ethylenic unsaturation, such as the natural rosins of the type of wood and gum rosin, and treated rosins such as heat-bleached, heat-treated, and isomerized rosins.

The unsaturated carbocyclic compounds used are those which are capable of selfpolymerization to hemicolloids; i. e., to polymers having at least 20 to 100 units per polymer molecule. Carbocyclic compounds of this type and suitable for use in this invention are compounds having a single center of unsaturation such as styrene, alpha-methyl styrene, alpha-methyl-para-methyl styrene, dichlorostyrene, indene, and phenyl acetylene; and compounds having at least two centers of unsaturation such as divinyl benzene, diisopropenyl benzene, cyclopentadiene, and mixtures of any of these compounds may be used. The molecular ratio of rosin to unsaturated carbocyclic compound in the condensation may vary from about 0.1 to 20. Any unreacted carbocyclic compound remaining may be removed from the condensation product, as for example by distillation.

Since a catalyst is desired, any of the well-known condensation catalysts may be used such as the Friedel-Crafts type catalysts including boron trifluoride, complexes of boron trifluoride with ethers and organic acids, halides of metals whose hydroxides are amphoteric, such as aluminum chloride, zinc chloride, stannic chloride, titanium tetrachloride, etc., and mineral acid condensation catalysts, such as hydrofluoric acid, fluoboric acid, sulfuric acid, and phosphoric acid. The Friedel-Crafts type catalysts are preferred.

When a catalyst is used for the condensation, a temperature range varying from as low as −50° C. to as high as 150° C. may be used. Ordinarily temperatures from about 0° C. to about 60° C. are preferred with boron trifluoride catalysts while with zinc chloride the preferred temperature range is 100° C. to 140° C.

Inert solvents may be used to improve the fluidity of the reactants and to facilitate dispersion of the catalyst. Satisfactory solvents are aromatic solvents such as benzene, xylene, and the like; hydrocarbon solvents such as cyclohexane and benzene hydrocarbons, and halogenated solvents such as carbon tetrachloride and ethylene dichloride.

The rosin condensates of this invention are stabilized resinous materials having decreased tendency to absorb oxygen. Moreover, they are generally higher melting than rosin and are believed to be true condensates as indicated by the low unsaponifiable content. The preferred products of this invention have an unsaponifiable content not substantially greater and melting points substantially higher than those of the rosins from which they are made. They are characterized by solubility in aromatic, paraffinic, and olefinic hydrocarbon solvents, turpentine, and drying oils. Their solubility in the lower alcohols is in general low, but increases as the molecular weight of the alcohol is increased.

The condensation products of rosin with unsaturated carbocyclic compounds having a single center of unsaturation appear to be high molecular weight monocarboxylic acids containing chiefly only one resin acid nucleus per molecule. These acids may be mixtures of condensation products wherein one or more molecule of unsaturated carbocyclic compound for example, is condensed with a single resin acid molecule. The condensation products of rosin with unsaturated carbocyclic compounds having more than one center of unsaturation in the molecule appear to contain polybasic acids wherein more than one resin acid nucleus has been condensed with the polyunsaturated carbocyclic compound. Moreover, the condensate appears to be a mixture of monocarboxylic acids and polycarboxylic acids depending upon the conditions used in effecting the condensation. An example of a condensate rich in dibasic acids and the conditions for its preparation are set forth in Table I, Example 8. The preferred condensates of this invention are those having an average molecular weight between about 350 and 1000. The condensation products containing various ratios of resin acid to carbocyclic compound are prepared by varying the amount of unsaturated carbocyclic compound added in the condensation and by controlling the rate of condensation.

The esters of the condensation products of rosin with unsaturated carbocyclic compounds may be prepared by heating with the desired alcohol at temperatures within the range of about 200° C. to about 350° C. with or without catalysts such as zinc and calcium salts.

The method of preparing the esters of the condensation products of rosin with unsaturated carbocyclic compounds of this invention and the properties of the esters so produced are illustrated by the examples of Table II.

TABLE II

| Ester and Varnish No. | Condensate | Ester Preparation ||||||||||
|---|---|---|---|---|---|---|---|---|---|---|---|
| | | Example of Table I | Wt. Calcium Acetate | Wt. Condensate | Wt. Glycerin | Wt. Pentaerythritol | Wt. Linseed Oil Fatty Acids | Time, Hrs. | Temperature, °C. | Acid Number | Drop Melting Point |
| 1 | Styrene-Rosin | 1 | | 600 | 50.2 | | | 12.5 | 200-270 | 10.8 | 137.5 |
| 2 | do | 2 | | 600 | 36.8 | | | 14.8 | 200-270 | 11.3 | 141 |
| 3 | Indene-Rosin | 14 | | 600 | 50.8 | | | 14 | 200-270 | 10.8 | 147 |
| 4 | Divinyl Benzene-Rosin | 8 | | 234 | 61 | | 345 | 8 | 220-270 | 7.5 | |
| 5 | do | 9 | | 400 | 54.7 | | | 20 | 200-270 | 10.5 | 165 |
| 6 | do | 9 | 1.1 | 400 | | 37.5 | | 7 | 280-295 | 22.5 | 176 |
| 7 | Cyclopentadiene-Rosin | 13 | | 600 | 55.2 | | | 13 | 200-270 | | 151 |

| Ester and Varnish No. | Condensate | Varnish Preparation ||||
|---|---|---|---|---|---|
| | | Wt. Ester | Z3 Linseed Oil | Z2 Dehydrated Castor Oil | Bodying Time (Mins.) 585° F. |
| 1 | Styrene-Rosin | 200 | 400 | | 100 |
| 2 | do | | | | |
| 3 | Indene-Rosin | 230 | 184 | 184 | 120 |
| 4 | Divinyl Benzene-Rosin | | | | |
| 5 | do | 230 | 184 | 184 | 60 |
| 6 | do | | | | |
| 7 | Cyclopentadiene-Rosin | 230 | 184 | 184 | 60 |

The alcohols which may be used to esterify the condensation products of rosin with the unsaturated carbocyclic compounds are the monohydric alcohols such as methyl alcohol, ethyl alcohol, propyl alcohol, etc., and the polyhydric alcohols such as glycol, glycerin, pentaerythritol, dipentaerythritol, sorbitol, mannitol, propylene glycol, polyethylene glycols, trimethylene glycol, and diglycerol. The polyhydric alcohol esters are hard resinous materials having decreased tendency to absorb oxygen and having in general melting points higher than the corresponding rosin esters. If desired, esters may likewise be prepared directly by use of a rosin ester in the condensation reaction. Mixed esters of the condensation products may be produced by esterification in admixture with other acidic materials as drying oil fatty acids.

Varnishes may be produced from the condensation products of this invention or their esters by customary varnishmaking technique with use of any of the well-known drying oils such as linseed oil, tung oil, dehydrated castor oil, soya oil, fish oil, sunflower seed oil, rapeseed oil, perilla oil, oiticica oil, hemp seed oil, and dissolving in a solvent. Driers are preferably added. A varnish prepared from the ester of a condensation product of a rosin with an unsaturated carbocyclic compound of this invention may be carried out as follows: 200 parts glycerin ester of a styrene-rosin condensation product (Ester No. 1, Table II) was dissolved in 400 parts Z3 (Gardner-Holdt viscosity) linseed oil and heated rapidly to 585° F. at which temperature the cooking was continued for 100 minutes. This varnish cook was then diluted with mineral spirits to a concentration of 50% and 0.5% lead and 0.07 cobalt were added as naphthenates. The viscosity of the resulting varnish was 1.25 poises. This varnish as well as those whose preparation is set forth in Table II showed fast drying characteristics together with excellent flexibility and excellent water and alkali resistance.

The compositions of this invention can thus be made into oleoresinous varnishes having bodying characteristics and drying characteristics superior to those prepared from rosin or polymerized rosin and whose varnish films have greater water resistance, flexibility, and stability toward oxidation.

What I claim and desire to protect by Letters Patent is:

1. A new composition of matter comprising a material of the group consisting of a resinous product of carbon-carbon condensation in the presence of an acid-acting condensation catalyst of rosin with an unsaturated carbocyclic hydrocarbon having a single center of unsaturation and being capable of self-polymerization to a hemicolloid and aliphatic esters of said resinous product, the molar ratio of rosin to carbocyclic hydrocarbon in the condensation product being from about 0.1 to 20.

2. A new composition of matter comprising a resinous product of carbon-carbon condensation in the presence of an acid-acting condensation catalyst of rosin with an unsaturated carbocyclic hydrocarbon having a single center of unsaturation and being capable of self-polymerization to a hemicolloid, the molar ratio of rosin to carbocyclic hydrocarbon in the condensation product being from about 0.1 to 20.

3. A new composition of matter comprising a resinous product of carbon-carbon condensation in the presence of an acid-acting condensation catalyst of rosin with styrene, the molar ratio of rosin to styrene in the condensation product being from about 0.1 to 20.

4. A new composition of matter comprising a material of the group consisting of a resinous product of carbon-carbon condensation in the presence of an acid-acting condensation catalyst of rosin with styrene and aliphatic esters of said resinous product, the molar ratio of rosin to styrene in the condensation product being from about 0.1 to 20.

5. A new composition of matter comprising a material of the group consisting of a resinous product of carbon-carbon condensation in the presence of an acid-acting condensation catalyst of rosin with α-methyl styrene and aliphatic esters of said resinous product, the molar ratio of rosin to α-methyl styrene in the condensation product being from about 0.1 to 20.

6. A new composition of matter comprising a material of the group consisting of a resinous product of carbon-carbon condensation in the presence of an acid-acting condensation catalyst of rosin with α-methyl-p-methyl styrene and aliphatic esters of said resinous product, the molar ratio of rosin to α-methyl-p-methyl styrene in the condensation product being from about 0.1 to 20.

7. A new composition of matter comprising a material of the group consisting of a resinous product of carbon-carbon condensation in the presence of an acid-acting condensation catalyst of rosin with indene and aliphatic esters of said resinous product, the molar ratio of rosin to indene in the condensation product being from about 0.1 to 20.

8. A new composition of matter comprising a resinous ester of an aliphatic alcohol and a product of carbon-carbon condensation in the presence of an acid-acting condensation catalyst of rosin with styrene, the molar ratio of rosin to styrene in the condensate being from about 0.1 to 20.

9. A new composition of matter comprising a resinous ester of an aliphatic alcohol and a product of carbon-carbon condensation in the presence of an acid-acting condensation catalyst of rosin with α-methyl styrene, the molar ratio of rosin to α-methyl styrene in the condensate being from about 0.1 to 20.

10. A new composition of matter comprising a resinous ester of an aliphatic alcohol and a product of carbon-carbon condensation in the presence of an acid-acting condensation catalyst of rosin with α-methyl-p-methyl styrene, the molar ratio of rosin to α-methyl-p-methyl styrene in the condensate being from about 0.1 to 20.

11. A new composition of matter comprising a resinous ester of an aliphatic alcohol and a product of carbon-carbon condensation in the presence of an acid-acting condensation catalyst of rosin with indene, the molar ratio of rosin to indene in the condensate being from about 0.1 to 20.

12. A coating composition comprising a resinous material selected from the group consisting of a resinous product of carbon-carbon condensation in the presence of an acid-acting condensation catalyst of rosin with an unsaturated carbocyclic hydrocarbon having a single center of unsaturation and being capable of self-polymerization to a hemicolloid and aliphatic polyhydric alcohol esters of said resinous product, the molar ratio of rosin to said carbocyclic hydrocarbon in the condensate being from about 0.1 to 20; and a volatile petroleum hydrocarbon solvent in an amount sufficient to yield a readily flowing mixture capable of application in a thin film.

13. A coating composition comprising a resinous material selected from the group consisting of a resinous product of carbon-carbon condensation in the presence of an acid-acting condensation catalyst of rosin with a unsaturated carbocyclic hydrocarbon having a single center of unsaturation and being capable of self-polymerization to a hemicolloid and aliphatic polyhydric alcohol esters of said resinous product, the molar ratio of rosin to said carbocyclic hydrocarbon in the condensate being from about 0.1 to 20; a drying oil; and a volatile petroleum hydrocarbon solvent in an amount sufficient to yield a readily flowing mixture capable of application in a thin film.

14. The method of producing a stabilized resinous material which comprises condensing one molar portion rosin with 0.1 to 20 molar portions unsaturated carbocyclic hydrocarbon having a single center of unsaturation and being capable of self-polymerization to a hemicolloid, at a temperature within the range of about −50° C. to about 150° C. in the presence of an acid-acting condensation catalyst.

15. The method of producing a stabilized resinous material which comprises condensing one molar portion rosin with 0.1 to 20 molar portions styrene at a temperature within the range of about −50° C. to about 150° C. in the presence of an acid-acting condensation catalyst.

16. The method of producing a stabilized resinous material which comprises condensing one molar portion rosin with 0.1 to 20 molar portions α-methyl styrene at a temperature within the range of about −50° C. to about 150° C. in the presence of an acid-acting condensation catalyst.

17. The method of producing a stabilized resinous material which comprises condensing one molar portion rosin with 0.1 to 20 molar portions α-methyl-p-methyl styrene at a temperature within the range of about −50° to about 150° C. in the presence of an acid-acting condensation catalyst.

18. The method of producing a stabilized resinous material which comprises condensing one molar portion rosin with 0.1 to 20 molar portions indene at a temperature within the range of about −50° C. to about 150° C. in the presence of an acid-acting condensation catalyst.

19. The method of producing a stabilized resinous material which comprises condensing one molar portion rosin with 0.1 to 20 molar portions phenyl acetylene at a temperature within the range of about −50° C. to about 150° C. in the presence of an acid-acting condensation catalyst.

ALFRED L. RUMMELSBURG.

REFERENCES CITED

The following references are of record in the file of this patent:

UNITED STATES PATENTS

| Number | Name | Date |
| --- | --- | --- |
| 1,942,531 | Barrett | Jan. 9, 1934 |
| 1,975,959 | Lawson et al. | Oct. 9, 1934 |
| 2,129,478 | Rohm | Sept. 6, 1938 |
| 2,251,806 | Rust et al. | Aug. 5, 1941 |
| 2,340,043 | Clare | Jan. 25, 1944 |
| 2,354,776 | Rummelsburg | Aug. 1, 1944 |
| 2,395,452 | Bruson | Feb. 26, 1946 |
| 2,468,770 | Morris et al. | May 3, 1949 |

Certificate of Correction

Patent No. 2,532,120                                                       November 28, 1950

ALFRED L. RUMMELSBURG

It is hereby certified that error appears in the printed specification of the above numbered patent requiring correction as follows:

Column 5, line 65, for "0.07" read *0.07%*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*